UNITED STATES PATENT OFFICE.

EMILE AUGUST FOURNEAUX, OF MANCHESTER, ENGLAND, ASSIGNOR TO BADISCHE ANILIN & SODA FABRIK, OF LUDWIGSHAFEN-ON-THE-RHINE, GERMANY, A CORPORATION.

PROCESS OF OBTAINING PARANITRANILIN RED, &c.

No. 913,633.       Specification of Letters Patent.      Patented Feb. 23, 1909.

Application filed November 29, 1907. Serial No. 404,426.

*To all whom it may concern:*

Be it known that I, EMILE AUGUST FOURNEAUX, a citizen of the United States, residing at Melrose, Crumpsall, Manchester, in the county of Lancaster, England, have invented new and useful Improvements in the Production of Red Shades on the Fiber, of which the following is a specification.

My invention relates to improvements in printing or dyeing paranitranilin red and similar coloring matters on textile fibers.

Heretofore the only practical method with which I am acquainted of producing paranitranilin red on the fiber has been to impregnate the fiber with an alkaline betanaphthol solution, dry, and then print, or pad, with a diazotized paranitranilin solution. Various attempts have been made to combine the two components in one printing color or solution but without practical success. The most promising of these attempts consisted in the use of nitrosamin red, the sodium salt of the inactive paranitrodiazobenzol, mixed with an alkaline naphthol solution, with or without the addition of ammonia salts, the color being developed by exposing the printed goods to the air, or to acid vapors, or to the action of steam, but this process has not been applied in practice because the shade of red obtained is not sufficiently good, the process is unreliable, and the printing or dyeing colors unstable. I have made an exhaustive study of this process in order to ascertain the causes of these shortcomings and to obviate them if possible. I have found that if a mixture of nitrosamin red and an alkaline betanaphthol solution is used the red is affected by the alkali which is freed upon its formation. A good red can be obtained if this excess of alkali is reduced by using a solution of naphthol in soap instead of in alkali, or by using naphthol in a state of extremely fine division, but the colors so prepared are not stable. If, on the other hand, nitrosamin red is used in connection with an alkaline betanaphthol solution and an ammonium salt the first effect is the production of a decomposable ammonium salt of the nitrosamin red, and the red obtained is tarnished by the brown bodies formed by the decomposition of this salt.

My invention consists in the addition of suitable esters to the above mentioned mixture of nitrosamin red and an alkaline betanaphthol solution, for the purpose of neutralizing the injurious excess of alkali generated when the reaction takes place. Under the term of esters I mean to include all organic substances which yield acids by hydrolysis, particularly also the esters derived from halogen acids, such as dichlorhydrin, chlorethylacohol and so on. Esters are preferably added in such quantity that they will on saponification neutralize a large part, or all, of the alkali, whereby a good red is obtained and the printing or dyeing colors are relatively stable.

Among esters some are more suitable for the present purpose than others. Generally speaking, apart from the matter of expense, the most suitable esters are those which are soluble in water, not too volatile, and which do not hydrolize so readily as to cause the premature formation of paranitranilin red in the printing color.

I prefer to carry out my invention by printing or padding the textile fiber with a suitable mixture, thickened if necessary, of an alkaline betanaphthol solution, nitrosamin red and an ester, or esters, with or without the customary additions such as naphtholmonosulfonic acid F, Turkey red oil, castor oil soap, and so on. Further useful additions to this mixture are mineral salts such as Glauber salt, which improve the stability of the printing colors, and certain metallic oxids or hydrates such as alumina hydrate or zinc oxid. If desired, however, as an alternative process the fibers may be prepared in the ordinary way with an alkaline betanaphthol solution, with or without the customary additions mentioned above, dried, and then printed or padded with nitrosamin red (suitably thickened if necessary) provided an addition of the proper quantity of a suitable ester or esters be made either to the prepare or to the nitrosamin color, or to both. In this case the solution of nitrosamin red can be made more stable by the addition of suitable mineral salts as mentioned above, or by the addition of small quantities of alkalies, which must be taken into account in determining the amount of acid ether to be used. The advantage of this latter process over the ordinary process of preparing the cloth with an alkaline betanaphthol solution and printing with a solution of the active paranitrodiazobenzol, is based on the fact that the inactive diazo compound nitrosamin red is far more stable than the active compound, hence it works better in the printing machine. In either case the red is developed by letting the goods lie for a sufficient length of time after drying, or by a short steaming, preferably after the red has been partly fastened by allowing the goods to lie.

The printing or padding colors may be used for the production of the well known resist or discharge styles. Thus they may be resisted by colors containing sulfites or organic acids or suitable acid salts, or they may be used for resisting or discharging other colors. For instance, a color of the type of Example 1 given below printed with the addition of zinc white or other suitable alkaline bodies and padded with anilin black after the red has been partly developed by lying, then aged, washed and soaped, produces a fast red resist under anilin black; with the addition of suitable metallic chromates a color of the type of Example 1 printed on indigo dyed cloth and developed by allowing the goods to lie with or without a short steaming to follow, then passed through the customary cutting bath produces a fast red discharge on indigo blue ground. Such applications may of course be multiplied and I do not mean to restrict myself to the above, which are merely given as examples.

My invention applies to the use of nitrosamin red, i. e. paranitrophenyl nitrosamin, and also of other nitrosamins which are suitable for combining with betanaphthol to form dyestuffs on the fiber, such for instance as the nitrosamins described in the specifications of Letters Patent Nos. 531,974, 531,975, 531,976, and 531,977.

The following examples will serve to illustrate further the nature of my invention and the method of carrying it into practical effect, but the invention is not confined to these examples. The parts are by weight.

Example 1: Twenty-five (25) parts betanaphthol and twenty-five (25) parts castor oil soap containing about sixty (60) per cent. fatty acids are dissolved in fifty (50) parts caustic soda thirty-six (36) degrees Twaddell and one hundred and twenty (120) parts water. This solution is stirred into five hundred and fifty (550) parts of a gum tragacanth solution in which sixty (60) parts of Glauber salt have been previously dissolved. Before use add fifteen (15) parts chlorethylalcohol and fifteen (15) parts neutral acetin containing forty-two (42) per cent. combined acetic acid and one hundred and twenty-five (125) parts of a twenty-five (25) per cent. nitrosamin red paste. This color is printed on white cloth and the goods are allowed to lie twenty-four (24) hours. They can then either be aged or not as the conditions may require.

Example 2: Twenty-five (25) parts betanaphthol and thirty (30) parts of castor oil soap containing about sixty (60) per cent. fatty acids are dissolved in fifty (50) parts caustic soda thirty-six (36) degrees Twaddell and one hundred and twenty (120) parts water. On the other hand one hundred and twenty-five (125) parts nitrosamin red, twenty-five (25) per cent. paste, are dissolved in nine hundred (900) parts water, the two solutions are mixed and fifteen (15) parts chlorethylalcohol and fifteen (15) parts neutral acetin containing forty-two (42) per cent. combined acetic acid added, and the whole made up to one thousand two hundred and fifty (1,250) parts by addition of water. Unprepared fiber is slop-padded with this solution and dried, and the red developed by allowing the goods to lie twenty-four (24) hours. They can then be aged or not as may be required.

Example 3: Three (3) parts betanaphthol and four (4) parts castor oil soap containing about sixty (60) per cent. fatty acids are dissolved in six (6) parts caustic soda thirty-six (36) degrees Twaddell and the required amount of hot water, the solution is then made up to one hundred and twenty (120) parts and one (1) part of chlorethylalcohol added. This solution is used for slop-padding the white fiber, which is then printed with the following color. One hundred and twenty-five (125) parts of nitrosamin red twenty-five (25) per cent. paste are stirred into seven hundred (700) parts of a tragacanth solution in which fifty (50) parts Glauber salt have been previously dissolved, and to which fifteen (15) parts of spirits of turpentine are added. Add to this a solution of twenty-four (24) parts urethane in ninety-four (94) parts water. The goods are allowed to lie for twenty-four (24) hours, and can then either be aged or not as the conditions may require.

Now what I claim is:

1. The production of paranitranilin red and similar coloring matters on the fiber by applying to the fiber an alkaline betanaphthol solution and a nitrosamin compound and neutralizing the injurious excess of alkali generated with an ester.

2. The production of paranitranilin red and similar coloring matters by applying to the fiber an alkaline betanaphthol solution, a nitrosamin compound and a suitable ester and then developing substantially as described.

3. The production of paranitranilin red and similar coloring matters on the fiber by preparing the fiber with an alkaline betanaphthol solution to which a suitable ester has been added, then drying, then printing or padding with a nitrosamin compound to which a suitable acid ether has been added and then developing substantially as described.

4. The production of paranitranilin red by applying to the fiber an alkaline betanaphthol solution, nitrosamin red and a suitable ester and then developing substantially as described.

5. The production of paranitranilin red on the fiber by preparing the fiber with an alkaline betanaphthol solution to which a suitable ester has been added, then drying, then printing or padding with nitrosamin red to which a suitable acid ether has been added and then developing substantially as described.

6. The production of paranitranilin red by applying to the fiber an alkaline betanaphthol solution, nitrosamin red and acetin and then developing substantially as described.

7. The production of paranitranilin red on the fiber by preparing the fiber with an alkaline betanaphthol solution to which acetin has been added, then drying, then printing or padding with nitrosamin red to which acetin has been added and then developing substantially as described.

8. The production of paranitranilin red by applying to the fiber an alkaline betanaphthol solution, nitrosamin red and acetin and then developing by drying and steaming substantially as described.

9. The production of paranitranilin red on the fiber by preparing the fiber with an alkaline betanaphthol solution to which acetin has been added, then drying, then printing or padding with nitrosamin red to which acetin has been added and then developing by drying and steaming substantially as described.

In testimony whereof I have hereunto set my hand in the presence of two subscribing witnesses.

EMILE AUGUST FOURNEAUX.

Witnesses:
  S. W. GILLETT,
  HERBERT ROWLAND ABBEY.